United States Patent
Kim et al.

(10) Patent No.: US 12,418,042 B2
(45) Date of Patent: Sep. 16, 2025

(54) CATHODE FOR ALL-SOLID-STATE BATTERY FOR PREVENTING SHORT-CIRCUITING BETWEEN ELECTRODES AND METHOD OF MANUFACTURING THE SAME

(71) Applicants: HYUNDAI MOTOR COMPANY, Seoul (KR); KIA MOTORS CORPORATION, Seoul (KR)

(72) Inventors: Yong Gu Kim, Suwon-si (KR); Yun Sung Kim, Seoul (KR); Ji Na Kim, Uiwang-si (KR); Sa Heum Kim, Suwon-si (KR); Hong Seok Min, Yongin-si (KR)

(73) Assignees: Hyundai Motor Company, Seoul (KR); KIA MOTORS CORPORATION, Seoul (KR)

( * ) Notice: Subject to any disclaimer, the term of this patent is extended or adjusted under 35 U.S.C. 154(b) by 347 days.

(21) Appl. No.: 17/010,295

(22) Filed: Sep. 2, 2020

(65) Prior Publication Data

US 2021/0083322 A1 Mar. 18, 2021

(30) Foreign Application Priority Data

Sep. 17, 2019 (KR) .................. 10-2019-0114022

(51) Int. Cl.
| | |
|---|---|
| *H01M 4/139* | (2010.01) |
| *H01M 4/36* | (2006.01) |
| *H01M 4/66* | (2006.01) |
| *H01M 10/0525* | (2010.01) |
| *H01M 10/0562* | (2010.01) |
| *H01M 10/058* | (2010.01) |

(52) U.S. Cl.
CPC ....... *H01M 10/0562* (2013.01); *H01M 4/139* (2013.01); *H01M 4/366* (2013.01); *H01M 4/661* (2013.01); *H01M 10/0525* (2013.01); *H01M 10/058* (2013.01)

(58) Field of Classification Search
CPC ......... H01M 10/0562; H01M 10/0525; H01M 10/058; H01M 4/139; H01M 4/366; H01M 4/661
See application file for complete search history.

(56) References Cited

U.S. PATENT DOCUMENTS

| | | | | |
|---|---|---|---|---|
| 2019/0115626 A1* | 4/2019 | Sadana | ................ | H01M 4/131 |
| 2019/0288277 A1* | 9/2019 | Michibata | ............ | H01M 4/362 |
| 2020/0083525 A1* | 3/2020 | Lee | ......................... | H01M 4/62 |

FOREIGN PATENT DOCUMENTS

| | | |
|---|---|---|
| CN | 106981684 A | 7/2017 |
| CN | 108701843 A | 10/2018 |
| CN | 109802165 A | 5/2019 |

(Continued)

*Primary Examiner* — Haixia Zhang
(74) *Attorney, Agent, or Firm* — Morgan Lewis & Bockius LLP

(57) ABSTRACT

A method of manufacturing a cathode for an all-solid-state battery includes: stacking a protective member on a cathode current collector, the protective member including a protective layer and a mask layer disposed on the protective layer and having a central portion which is an empty space; coating the protective member with a cathode material so that the central portion of the protective member is filled with the cathode material; and removing the mask layer to form a cathode coating layer.

9 Claims, 9 Drawing Sheets

(56) References Cited

FOREIGN PATENT DOCUMENTS

| | | |
|---|---|---|
| EP | 2309581 A1 | 4/2011 |
| JP | 2011-216403 A | 10/2011 |
| JP | 2014-203740 A | 10/2014 |
| JP | 6394480 B2 | 9/2018 |
| KR | 101846748 B1 * | 4/2018 ......... H01M 4/0404 |

* cited by examiner

CATHODE FOR ALL-SOLID-STATE BATTERY FOR PREVENTING SHORT-CIRCUITING BETWEEN ELECTRODES AND METHOD OF MANUFACTURING THE SAME

CROSS REFERENCE TO RELATED APPLICATION

The present application claims the benefit of priority to Korean Patent Application No. 10-2019-0114022, filed on Sep. 17, 2019 in the Korean Intellectual Property Office, the entire content of which is incorporated herein for all purposes by this reference.

TECHNICAL FIELD

The present disclosure relates to a cathode for an all-solid-state battery and a method of manufacturing the same, and more particularly to, a cathode for an all-solid-state battery, which is capable of preventing short-circuiting between electrodes by applying an insulating layer having insulating properties on the cathode, and a method of manufacturing the same.

BACKGROUND

A secondary battery is a battery that repeats charging and discharging by bidirectionally converting chemical energy and electrical energy through oxidation/reduction chemical reactions, and generally includes four basic elements, that is, a cathode, an anode, a separator, and an electrolyte. At the electrodes, including the cathode and the anode, the material that actually causes a reaction among the electrode material components is referred to as an active material.

For a lithium ion secondary battery, a liquid electrolyte and an electrolyte including a liquid are used. However, the liquid electrolyte is disadvantageous because of volatility, a risk of explosion, and low thermal stability. In contrast, an all-solid-state battery using a solid electrolyte has a low risk of explosion and superior thermal stability. Moreover, the electrodes are stacked using a bipolar plate to enable series connection, resulting in high operating voltage. Hence, higher energy density is expected compared to cells that are connected in parallel using a liquid electrolyte.

Electrode-electrolyte contact problems greatly occur in all-solid-state batteries, unlike conventional batteries using liquid electrolytes. Since the all-solid-state battery transfers lithium ions through solid-solid contact, an additional pressurization or heat treatment process between the electrode and the electrolyte is essential in order to improve contact between the electrode and the electrolyte upon cell stacking. As the pressure that is applied is larger, the contact between the electrode and the electrolyte is improved, thereby enhancing cell characteristics. In this case, however, the inside of the cell is more frequently shorted. Moreover, in the case of a cell stack rather than a single cell, short-circuiting of the cell more frequently occurs on account of non-uniform stress due to area mismatch upon electrode stacking.

The information included in this Background section is only for enhancement of understanding of the general background of the present disclosure and may not be taken as an acknowledgement or any form of suggestion that this information forms the prior art already known to a person skilled in the art.

SUMMARY

An objective of the present disclosure is to solve a short-circuiting problem during the manufacture of an electrode.

Another objective of the present disclosure is to provide a structure that is able to reduce electrode short-circuiting and a defect rate.

Still another objective of the present disclosure is to improve processability by enabling continuous processing when manufacturing an electrode for an all-solid-state battery.

The objectives of the present disclosure are not limited to the foregoing, and will be able to be clearly understood through the following description and to be realized by the means described in the claims and combinations thereof.

According to an exemplary embodiment of the present disclosure, a method of manufacturing a cathode for an all-solid-state battery includes: preparing a protective member including a protective layer and a mask layer disposed on the protective layer, the protective member having therein a central portion which is an empty space; stacking a protective member on a cathode current collector, the protective member including a protective layer and a mask layer disposed on the protective layer and having a central portion which is an empty space coating the protective member with a cathode material so that the central portion of the protective member is filled with the cathode material; and removing the mask layer to form a cathode coating layer.

The mask layer may include polyethylene naphthalate (PEN), and the protective layer may include polyethylene naphthalate (PEN).

In the preparing of the protective member, the mask layer may be stacked on the upper surface of the protective layer and a release sheet may be attached to the lower surface of the protective layer.

An adhesive may be interposed between the protective layer and the mask layer.

In the stacking of the protective member, an adhesive layer may be interposed between the cathode current collector and the protective member, and the adhesive layer may include any one selected from the group consisting of ethylene vinyl acetate (EVA) copolymer, polyvinyl acetate (PVA), polyethylene (PE), amorphous polypropylene, thermoplastic elastomer, polyamide, polyester and combinations thereof.

The stacking of the protective member on the cathode current collector may be performed using either or both of heat and pressure.

In the removing of the mask layer, the mask layer and the cathode material applied on the mask layer may be removed, and the cathode material may remain in the form of being inserted into the central portion of the protective layer to form the cathode coating layer.

The thickness $L_3$ of the cathode material may be greater than or equal to a sum of the thickness $L_1$ of the protective layer and the thickness $L_2$ of the mask layer.

The thickness $L_3'$ of the cathode coating layer may be greater than or equal to the thickness $L_1$ of the protective layer.

The method of the present disclosure may further include punching the protective layer, the cathode coating layer and the cathode current collector after removing the mask layer.

The punching of the protective layer, the cathode coating layer and the cathode current collector may be performed at a predetermined interval apart from the central portion of the protective layer, and the upper surface and the lower surface of the punched protective layer may have any one shape of a circular shape and a polygonal shape.

According to another exemplary embodiment of the present disclosure, a cathode for an all-solid-state battery includes a cathode current collector, a cathode coating layer folioed on the cathode current collector, and an insulating layer disposed on the cathode current collector and having therein a central portion, which is an empty space, in which the upper surface of the central portion has any one shape of a circular shape and a polygonal shape, and the cathode coating layer is inserted into the central portion so that a portion of an outer side surface of the cathode coating layer and a side surface of the central portion are in contact with each other.

The cathode current collector may include any one selected from the group consisting of nickel, copper, zinc, aluminum and combinations thereof.

The cathode coating layer may include an active material and a binder.

The insulating layer may include an insulator.

The insulating layer may include polyethylene naphthalate (PEN).

The thickness of the insulating layer may be 0.80 to 1.30 times the thickness of the cathode coating layer.

The insulating layer may have a thickness of 100 μm or less and the cathode coating layer may have a thickness of 80 to 115 μm.

The inner diameter $Ø_x$ of the insulating layer may be equal to the diameter $Ø_z$ of the cathode coating layer, and the outer diameter $Ø_y$ of the insulating layer may satisfy Expression 1 below.

$$1.1Ø_x \leq Ø_y \leq 2.0Ø_x \quad \text{[Expression 1]}$$

In addition, the present disclosure provides an all-solid-state battery, including the cathode described above, an anode, and a solid electrolyte interposed between the cathode and the anode.

According to the present disclosure, a problem of short-circuiting when manufacturing an electrode can be solved.

According to the present disclosure, a novel structure that is able to reduce electrode short-circuiting and a defect rate can be provided.

According to the present disclosure, processability can be increased by enabling continuous processing when manufacturing an electrode for an all-solid-state battery, and economic benefits can be obtained.

The effects of the present disclosure are not limited to the foregoing, and should be understood to include all effects that can be reasonably anticipated from the following description.

DESCRIPTION OF SPECIFIC EMBODIMENTS

Figure 1:
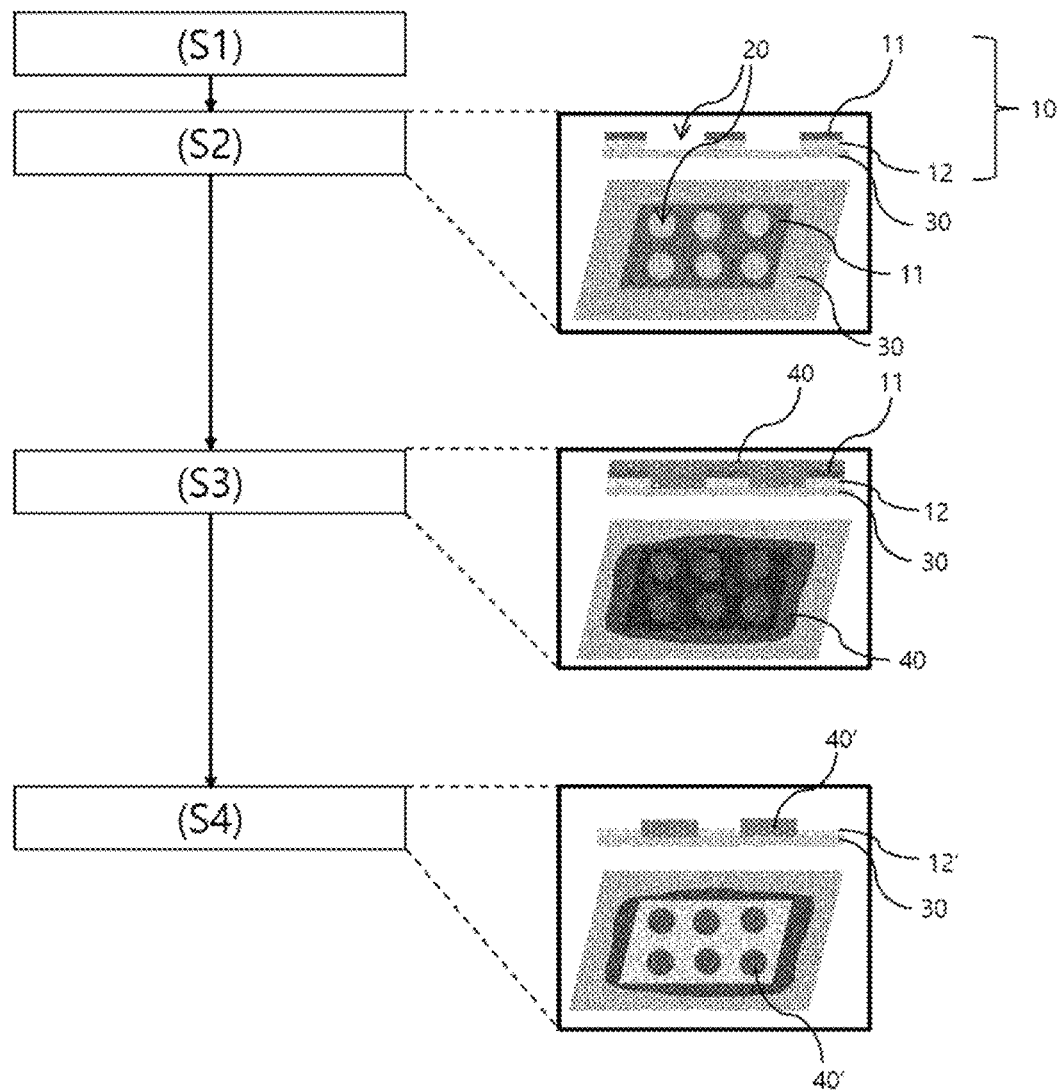
FIG. 1 schematically shows a process of manufacturing a cathode for an all-solid-state battery according to the present disclosure.

The above and other objectives, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Further, for example, the range of "10% to 30%" will be understood to include any subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

The present disclosure pertains to a method of manufacturing a cathode for an all-solid-state battery and a cathode for an all-solid-state battery manufactured by the method. The method of manufacturing the cathode for an all-solid-state battery, which is a method disclosure, and the cathode for an all-solid-state battery, which is a product disclosure, are described below.

Here, a description of overlapping features in the method disclosure and the product invention will be omitted.

Method of Manufacturing Cathode for all-Solid-State Battery

The method of manufacturing the cathode for an all-solid-state battery according to the present disclosure includes preparing a protective member including a protective layer and a mask layer disposed on the protective layer and having therein multiple central portions, which are empty spaces, stacking the protective member on a cathode current collector, coating the protective member with a cathode material so that the central portions of the protective member are filled with the cathode material, and removing the mask layer to form a cathode coating layer.

FIG. 1 shows the steps for manufacturing the cathode for an all-solid-state battery according to the present disclosure and the formation of the cathode through individual steps.

Individual steps are described in detail with reference to FIG. 1.

Preparation (S1)

A protective member 10, including a protective layer 12 and a mask layer 11 disposed on the protective layer 12 and having therein central portions 20, which are columnar empty spaces, is prepared. More specifically, the protective member 10 is configured such that the protective layer 12 and the mask layer 11 are stacked in contact with each other and the protective layer 12 and the mask layer 11 have holes that are formed in a predetermined pattern. Here, the pattern is folioed of a plurality of circular or polygonal shapes, but this is merely an option that may be selected depending on the purpose of the invention, and the present disclosure is not limited thereto.

The mask layer 11 needs to be folioed of a material that is resistant to a solvent or the like contained in the cathode material 40. In particular, in the all-solid-state battery, a nonpolar solvent such as xylene or heptane may be used, and thus a material resistant thereto may be used.

Specifically, the mask layer 11 includes polyethylene naphthalate (PEN).

The protective layer 12 needs to be formed of a material that is resistant to a solvent or the like contained in the cathode material 40. When drying the electrode, the material should be capable of withstanding a certain temperature (e.g. about 120° C.) and preferably has a coefficient of thermal expansion similar to that of the cathode current collector 30.

Specifically, the protective layer 12 includes polyethylene naphthalate (PEN).

The cathode current collector 30 functions to transport electrons generated from a cathode coating layer 40', and may include any one selected from the group consisting of nickel, copper, zinc, aluminum and combinations thereof.

The mask layer 11 is stacked on the upper surface of the protective layer 12, and a release sheet may be attached to the lower surface of the protective layer 12. Here, the release sheet may be removed before attachment of the protective member 10 to the upper surface of the cathode current collector 30.

The protective layer 12 and the mask layer 11 are stacked in contact with each other, and an adhesive may be interposed between the protective layer 12 and the mask layer 11.

The adhesive is used to prevent distortion of the protective layer 12 and the mask layer 11, which are laminated with each other, by appropriately selecting the adhesiveness thereof, or to prevent the cathode material 40 from penetrating between the mask layer 11 and the protective layer 12 when coating with the cathode material 40. Moreover, it is used to facilitate the removal of the mask layer 11 from the protective layer 12 without using a large force.

The adhesive may include a silicone-based pressure sensitive adhesive (PSA) that is easily removable.

The PSA includes acrylate or silicone, and may further include any one selected from the group consisting of ester rubber, phenol resin, castor oil, polyisobutylene and combinations thereof.

The adhesive of the present disclosure, including silicone, has superior heat resistance, cold resistance, water resistance, insulating properties, ozone resistance, low combustibility, chemical inertness and non-pollutiveness, does not melt at high temperatures, and exhibits flexibility and adhesiveness even at very low temperatures.

In order to enhance adhesion, a silicone adhesive composition including any one functional group selected from the group consisting of a hydroxyl group, an alkoxy group, an epoxy group and combinations thereof may be used as the adhesive.

Stacking (S2)

The protective member 10 is stacked on the cathode current collector 30. Here, stacking the protective member 10 on the cathode current collector 30 may be performed using either or both of heat and pressure.

Moreover, an adhesive layer may be interposed between the cathode current collector 30 and the protective member 10. More specifically, an adhesive layer may be interposed between the cathode current collector 30 and the protective layer 12 of the protective member 10.

The adhesive layer needs to be folioed of a material that is resistant to a solvent or the like contained in the cathode material 40 and should be capable of withstanding an electrode drying temperature (e.g. about 120° C.) Moreover, a coefficient of thermal expansion may be similar to that of the cathode current collector 30. The adhesive layer is different from the adhesive of the present disclosure in that the protective layer 12 and the cathode current collector 30 are attached such that they are not detached from each other.

The adhesive layer may include a thermoplastic adhesive, and specifically, the thermoplastic adhesive includes any one selected from the group consisting of ethylene vinyl acetate (EVA) copolymer, polyvinyl acetate (PVA), polyethylene (PE), amorphous polypropylene, thermoplastic elastomer, polyamide, polyester and combinations thereof.

The application of the thermoplastic adhesive described above enables continuous manufacture and the formation of an adhesive layer having a uniform adhesion surface.

Coating (S3)

The protective member 10 is coated with the cathode material 40 so that the central portions 20 of the protective member 10 are filled with the cathode material 40. Specifically, the cathode material 40 is applied on the central portions 20 of the protective member 10, which are empty spaces forming a predetermined pattern, and on the mask layer 11 of the protective member 10, whereby the central portions 20 are filled with the cathode material 40. Although the mask layer 11 may be fully covered with the cathode material 40, only the central portions 20, rather than the mask layer 11, may be filled as necessary.

The cathode material includes an active material, a binder and a solvent, and may further include a conductor for increasing electronic conductivity as necessary. Here, the binder, the solvent and the conductor may be materials typically used in conventional secondary batteries and the like, and are not particularly limited in the present disclosure.

It is sufficient that the active material can be used in the technical field of all-solid-state batteries, for example, nickel-cobalt-manganese (NCM), nickel-cobalt-aluminum (NCA), lithium-manganese oxide (LMO), lithium-cobalt oxide (LCO), nickel-manganese oxide (NMO), etc. may be included in the active material.

After the coating process, drying the electrode material may be further performed.

Through the drying process, the solvent is removed from the electrode material and the density of the active material and the binder contained in the electrode material may be further increased.

Removal (S4)

A cathode coating layer 40' is formed by removing the mask layer 11 from the protective member 10. Specifically, when the cathode material 40 is applied on the mask layer 11, the cathode material 40 applied on the mask layer 11 is removed together with the mask layer 11. Here, only the cathode coating layer 40', dried in the form of being inserted into the central portions 20, is left behind. More specifically, the cathode coating layer 40' is left behind in the form of a column having the pattern shape of the central portions 20. Hence, the mask layer 11 is removed, whereby the thickness of the cathode coating layer 40' included in the central portions 20 is naturally greater than the thickness of the protective layer 12.

Figure 2:
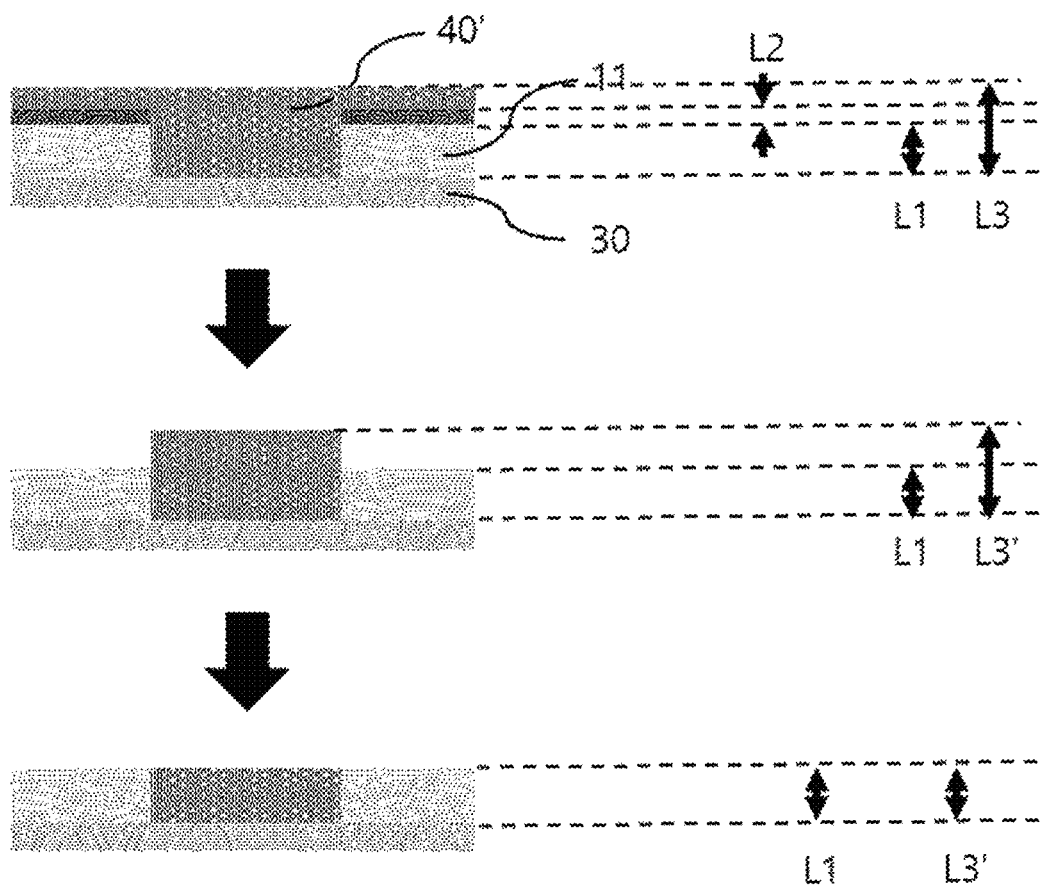
FIG. 2 shows thicknesses of the components included in the cathode for an all-solid-state battery according to the present disclosure.

After the removal process, the cathode coating layer 40' is pressurized, thereby further increasing the density of the active material and the binder included in the cathode coating layer 40'. Here, the thickness of the cathode coating layer 40' may become equal to or smaller than the thickness of the protective layer 12. FIG. 2 shows changes in the thickness of the cathode material 40 after the coating process, the thickness of the cathode coating layer 40' after the removal process and the thicknesses of the protective layer 12 and the mask layer 11. As shown in FIG. 2, the thickness L3 of the cathode material 40 is greater than the sum of the thickness L1 of the protective layer 12 and the thickness L2 of the mask layer 11, and after the mask layer 11 is removed, the thickness L3' of the cathode coating layer 40' is greater than the thickness L1 of the protective layer 12. Subsequently, when pressure is applied to the cathode coating layer 40', the thickness L3' of the cathode coating layer 40' may become equal to the thickness L1 of the protective layer 12.

According to the present disclosure, the thickness L1 of the protective layer 12 is 0.80 to 1.30 times the thickness L3' of the cathode coating layer 40', and preferably 0.85 to 1.25 times thereof. If the thickness is less than 0.80 times or is greater than 1.30 times thereof, the stack of the electrolyte and the anode formed on the cathode including the cathode coating layer 40' may not be level, and there is a risk of internal short-circuiting.

In the present disclosure, a punching process may be further performed after the removal process. The punching process is carried out to form a predetermined shape of the protective layer 12, the cathode coating layer 40' and the cathode current collector 30, which are laminated together.

The punching process is performed at a predetermined interval apart from the central portion 20 of the protective layer 12, and the upper and lower surfaces of the punched protective layer 12 have a circular shape or a polygonal shape.

Figure 3:
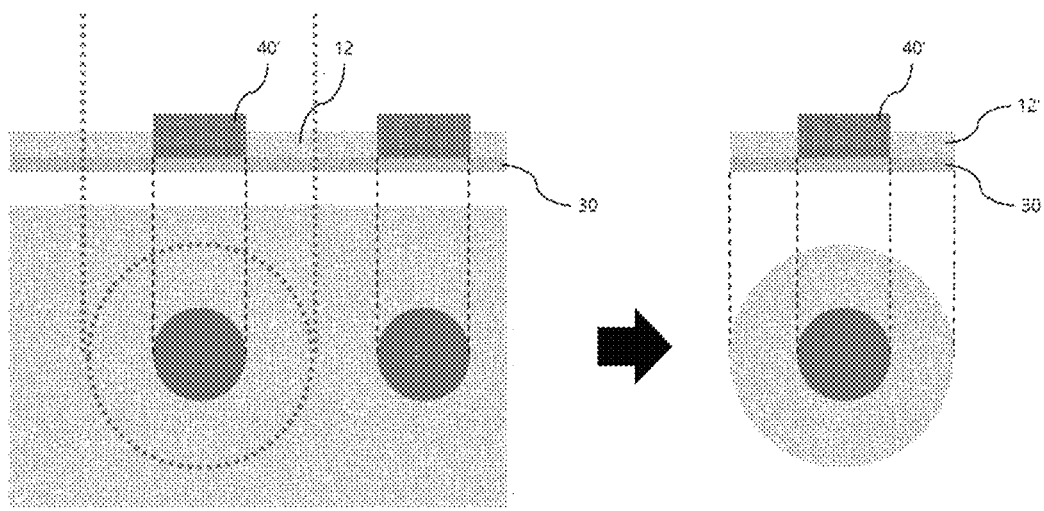
FIG. 3 shows a side view and a top plan view of the cathode for an all-solid-state battery according to the present disclosure before and after a punching process.

FIG. 3 shows the punching process in which the upper and lower surfaces of the protective layer 12 have a circular shape according to an embodiment of the present disclosure. With reference thereto, the cathode coating layer 40' is provided in the form of being inserted into the multiple central portions 20 of the protective layer 12, and the punching process is performed in a circular shape at a predetermined interval apart from each of the multiple central portions 20 of the protective layer 12. The punching process enables the outer appearance of the protective layer 12 and the cathode current collector 30 to be circular.

An all-solid-state battery is manufactured from each of the multiple central portions 20 of the protective layer 12, whereby a cathode including the protective layer 12 may be mass-produced through a single process.

Cathode for all-Solid-State Battery

According to the present disclosure, the cathode for an all-solid-state battery includes a cathode current collector 30, a cathode coating layer 40' having a columnar shape formed on the cathode current collector 30, and an insulating layer 12' disposed on the cathode current collector 30 and having therein a central portion 20, which is a columnar empty space.

Specifically, the upper surface of the central portion 20 has a circular shape, and the cathode coating layer 40' is inserted into the central portion 20, and thus a portion of the outer side surface of the cathode coating layer 40' and the side surface of the central portion 20 are in contact with each other.

Here, the insulating layer 12' is formed of the same type of material as the protective layer 12 of the present disclosure, and the insulating layer 12' is configured to include only one central portion 20, unlike the protective layer 12 in a plate form having multiple central portions 20 in the manufacturing method. The insulating layer 12' may be obtained by punching the protective layer 12, and there is no difference in material therebetween.

Referring to FIG. 3 again, the protective layer 12 before the punching process is illustrated on the left side, and the insulating layer 12' after the punching process is illustrated on the right side.

The insulating layer 12' may include an insulator. The insulating layer 12' is used to prevent short-circuiting between electrodes or between the electrode and the electrolyte. As the insulator, any material may be used without particular limitation, so long as it is able to interrupt the flow of electrons.

The thickness of the insulating layer 12' may be smaller than or equal to the thickness of the cathode coating layer 40', as shown in FIG. 2.

The thickness of the insulating layer 12' is 100 μm or less, and the thickness of the cathode coating layer 40' is 80 to 115 μm.

Figure 4A:
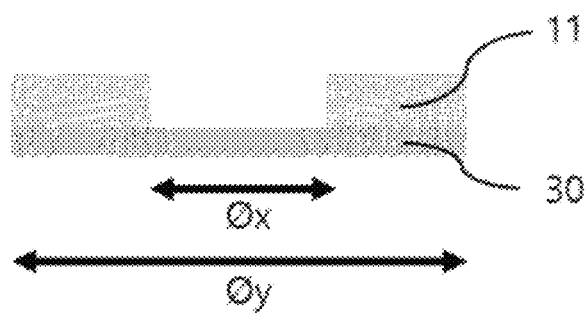
FIGS. 4A, 4B, and 4C show diameters of an insulating layer, a cathode coating layer, an anode and a solid electrolyte according to the present disclosure.
Figure 4B:
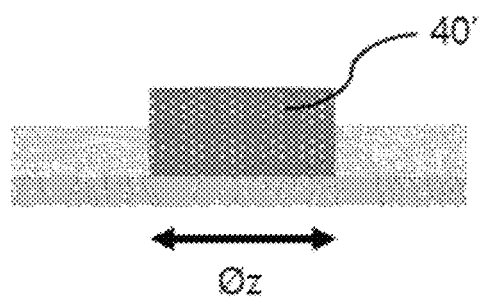
Figure 4C:
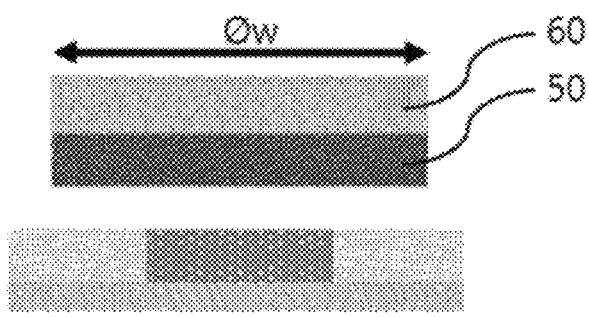

FIGS. 4A to 4C show the outer diameter and the inner diameter of the insulating layer 12' having a circular shape, and the diameter of the cathode coating layer 40', according to an embodiment of the present disclosure. With reference thereto, FIG. 4A shows the inner diameter $Ø_x$ of the insulating layer 12' and the outer diameter $Ø_y$ of the insulating layer 12'. The inner diameter $Ø_x$ is equal to the diameter of the central portion 20 of the insulating layer 12', and the outer diameter $Ø_y$ is equal to the diameter of the pattern that is punched.

FIG. 4B shows the diameter $Ø_z$ of the cathode coating layer 40' formed in the central portion 20 of the insulating layer 12', in which the cathode coating layer 40' is fully loaded in and inserted into the central portion 20 of the insulating layer 12'. Hence, the diameter $Ø_z$ of the cathode coating layer 40' is equal to the diameter of the central portion 20. Specifically, the diameter $Ø_z$ of the cathode coating layer 40' is equal to the inner diameter $Ø_x$ of the insulating layer 12'.

In the present disclosure, the outer diameter $Ø_y$ of the insulating layer 12' satisfies Expression 1 below.

$$1.1Ø_x \leq Ø_y \leq 2.0Ø_x \quad \text{[Expression 1]}$$

Preferably, the outer diameter $Ø_y$ of the insulating layer 12' satisfies Expression 2 below.

$$1.1Ø_x \leq Ø_y \leq 1.5Ø_x \quad \text{[Expression 2]}$$

Here, if the outer diameter of the insulating layer 12' is less than $1.1Ø_x$, the area of the insulating layer 12' is excessively small, and thus the insulating layer cannot function as an insulator for preventing short-circuiting between electrodes. On the other hand, if the outer diameter thereof exceeds $2.0Ø_x$, the area of the cathode coating layer 40' may decrease, thus deteriorating battery performance and efficiency.

In the present disclosure, when the insulating layer 12' has a polygonal shape, rather than a circular shape, the central portion has a polygonal shape corresponding to the shape of the insulating layer 12'. Here, $Ø_y$ designates the outer diameter of the insulating layer having a polygonal shape, and $Ø_x$ designates the inner diameter of the insulating layer in the direction in which the outer diameter is measured, which satisfies Expression 3 below.

$$0.1 \leq (Ø_y - Ø_x) \leq 1.0 \quad \text{[Expression 3]}$$

When the insulating layer 12' has a polygonal shape, the shape of the cathode coating layer inserted into the central portion may be polygonal depending on the above polygonal shape.

All-Solid-State Battery

According to the present disclosure, the all-solid-state battery includes the cathode for an all-solid-state battery of the present disclosure, an anode 60, and a solid electrolyte 50 interposed between the cathode and the anode 60.

FIG. 4C shows the cathode of the present disclosure including the cathode current collector 30, the insulating layer 12' and the cathode coating layer 40', with the solid electrolyte 50 and the anode 60 stacked on the cathode.

The present disclosure pertains to the cathode for a battery including a solid electrolyte 50, and does not particularly limit the types of the anode 60 or the solid electrolyte 50.

For example, LISICON-based compounds, thio-LISCON-based compounds, lithium sulfide ($Li_2S$)-based compounds, lithium sulfide ($Li_2S$)-phosphorus disulfide ($P_2S_5$) mixtures, azirodite-based compounds and the like can be used as the solid electrolyte 50.

Diameters of the anode 60 and the solid electrolyte 50 are equal to each other, the diameter $Ø_w$ of the anode 60 and the solid electrolyte 50 needs to be greater than the diameter $Ø_z$ of the cathode coating layer 40' or the inner diameter $Ø_x$ of the insulating layer 12', and smaller than the outer diameter $Ø_y$ of the insulating layer 12'. If the diameters fall out of the above ranges, there is a risk of short-circuiting between electrodes and battery efficiency may deteriorate.

A better understanding of the present disclosure will be given through the following examples. However, these examples are merely set forth to illustrate the present disclosure, and are not to be construed as limiting the scope of the present disclosure.

Example 1

A protective member, configured such that a protective layer (PEN film) having a thickness of about 90 μm and a mask layer (PEN film) having a thickness of 30 μm were sequentially attached to the upper surface of a release film, was punched to form a central portion in a circular pattern having a diameter of 14 μmm, the release film was removed, and the protective member was thermally fused to a cathode current collector (Al foil) having a polyethylene film attached thereto by applying heat at 100° C. Here, a silicone adhesive was interposed between the protective layer and the mask layer.

On the mask layer and the cathode current collector exposed through the central portion, a cathode material including lithium cobalt oxide ($LiCoO_2$), carbon black and polyvinylidene fluoride (PVdF) was applied and dried in a vacuum for 8 hr.

Thereafter, the mask layer and the dried cathode material on the mask layer were removed, and pressure was applied using a press so that the average thickness of the cathode coating layer remaining in the form of being inserted into the central portion was 100 μm.

The cathode current collector including the protective layer and the cathode coating layer was punched in a circular pattern having a diameter of 18 μmm.

Thereafter, a solid electrolyte having a diameter of 16 mm and including lithium (Li), lanthanum (La), zirconium (Zr), oxide (O) and polyvinylidene fluoride, and an anode including graphite and polyvinylidene fluoride were sequentially stacked and pressed to respective average thicknesses of 40 μm and 90 μm, thereby manufacturing an all-solid-state battery (in which the amounts of the cathode, the anode and the electrolyte therein were 23.22 μmg/cm², 15.33 μmg/cm² and 6.18 μmg/cm², respectively).

Figure 5:
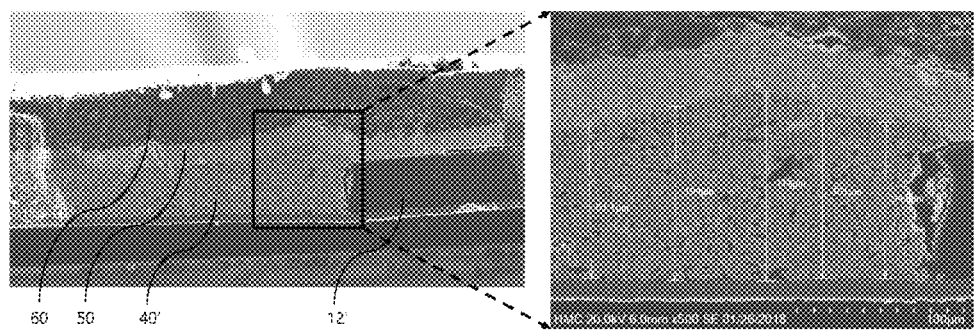
FIG. 5 shows scanning electron microscope (SEM) images of the cross-section of the all-solid-state battery manufactured in Example 1 according to the present disclosure.

FIG. 5 shows the cross-sectional images of the all-solid-state battery of Example 1 manufactured above. With reference thereto, it can be confirmed that the cathode coating layer and the insulating layer have almost the same thickness and thus the side surface of the cathode is completely protected by virtue of the insulating layer.

Figure 6:
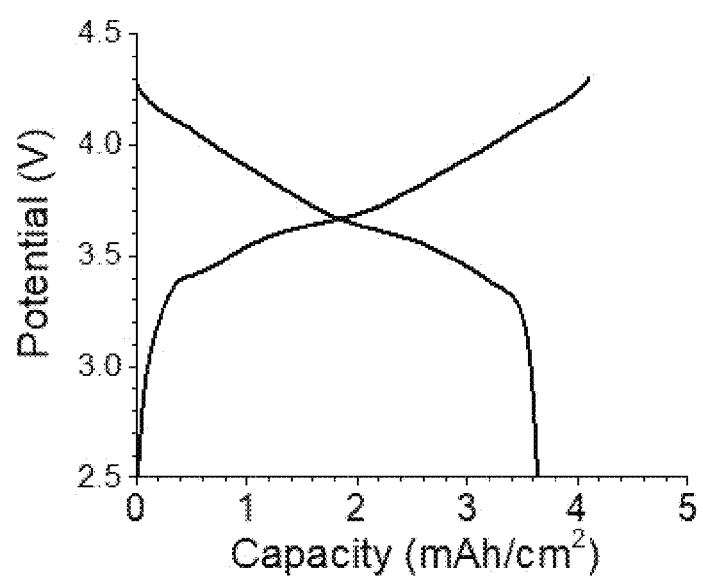
FIG. 6 shows a charge/discharge curve of the all-solid-state battery manufactured in Example 1 according to the present disclosure.

FIG. 6 is a charge/discharge graph of the all-solid-state battery manufactured above, particularly a charge/discharge graph after 200 charge/discharge cycles at a voltage (V) ranging from 2.5 to 4.3. With reference thereto, it can be confirmed that stable charge/discharge results appear even when the solid electrolyte is thin.

Comparative Examples 1 to 3

On a cathode current collector, a cathode material including lithium cobalt oxide ($LiCoO_2$), carbon black and polyvinylidene fluoride (PVdF) was applied and dried in a vacuum for 8 hr, and pressure was then applied thereto using a press so as to attain an average thickness of 100 The cathode current collector coated with the cathode material was punched in a circular pattern having a diameter of 18 μmm.

Thereafter, the solid electrolyte and the anode, which were the same as in Example 1, were prepared and sequentially stacked, thus manufacturing three all-solid-state batteries.

Figure 7:
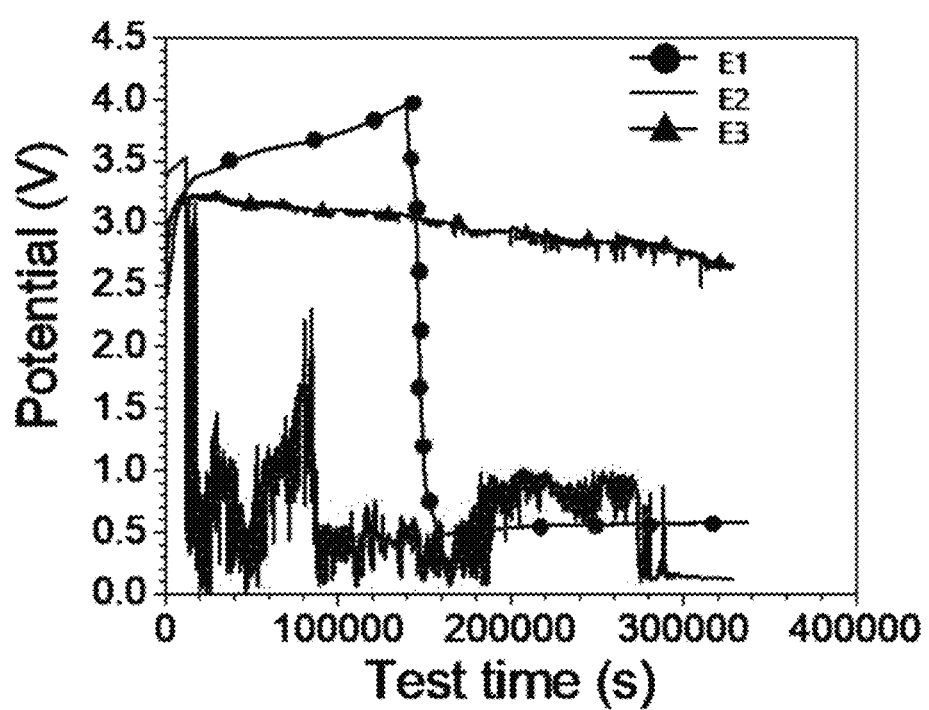
FIG. 7 shows the results of charging in the case of Comparative Example 1.

The three all-solid-state batteries, particularly those of Comparative Example 1 (E1), Comparative Example 2 (E2) and Comparative Example 3 (E3), were subjected to a charging test. The results are shown in FIG. 7. With reference thereto, it can be seen that these batteries do not operate like nor al cells. This is deemed to be caused by short-circuiting between the cathode and the anode attributed to cracking of the solid electrolyte at the boundary portion upon pressurization of the cell due to the difference in area between the cathode and the anode.

As is apparent from the results of Example 1 and Comparative Examples 1 to 3, the protective member including the protective layer and the mask layer is applied, whereby the patterned cathode coating layer and insulating layer can be efficiently aligned with each other. Moreover, the edge of the cathode coating layer is protected by the insulating layer, and thus, when the all-solid-state battery is pressurized, problems of cracking of the solid electrolyte in contact with the edge portion of the cathode coating layer and short-circuiting between electrodes are solved, ultimately enabling stable charging and discharging performance to be realized.

Although the embodiments of the present disclosure have been disclosed for illustrative purposes, those skilled in the art will appreciate that various modifications are possible without departing from the scope and spirit of the invention as disclosed in the accompanying claims, and such modifications should not be understood separately from the technical ideas or essential characteristics of the present disclosure.

What is claimed is:

1. A method of manufacturing a cathode for an all-solid-state battery, the method comprising:
    stacking a protective member on a cathode current collector, the protective member including a protective layer and a mask layer disposed on the protective layer and having a central portion which is an empty space;
    coating the protective member with a cathode material so that the central portion of the protective member is filled with the cathode material;
    removing the mask layer to form a cathode coating layer; and
    pressurizing the cathode coating layer,
    punching the protective layer, the cathode coating layer, and the cathode current collector after removing the mask layer,
    wherein an insulating layer is formed through the punching against the protective layer,
    wherein the cathode coating layer has a thickness of 80 to 115 μm,
    wherein an adhesive layer is interposed between the cathode current collector and the protective member,
    wherein the adhesive layer includes any one selected from the group consisting of an ethylene vinyl acetate (EVA) copolymer, polyvinyl acetate (PVA), polyethylene (PE), amorphous polypropylene, a thermoplastic elastomer, polyamide, polyester, and combinations thereof,
    wherein the insulating layer has a circular shape with an inner diameter $Ø_x$ and an outer diameter $Ø_y$, and
    wherein the inner diameter $Ø_x$ and the outer diameter $Ø_y$ of the insulating layer satisfy Expression 1 below:

$$1.1Ø_x \leq Ø_y \leq 2.0Ø_x. \quad \text{[Expression 1]}$$

2. The method of claim 1, wherein the mask layer includes polyethylene naphthalate (PEN), and
    wherein the protective layer includes polyethylene naphthalate (PEN).

3. The method of claim 1, wherein the mask layer is disposed on an upper surface of the protective layer.

4. The method of claim 3, wherein an adhesive is interposed between the protective layer and the mask layer.

5. The method of claim 1, wherein the protective member is stacked on the cathode current collector by applying at least one of heat or pressure.

6. The method of claim 1, wherein, in the removing the mask layer, the mask layer and the cathode material applied on the mask layer are removed, and the cathode material is maintained in a shape of being inserted into the central portion of the protective layer as the cathode coating layer.

7. The method of claim 1, wherein a thickness of the cathode material is greater than or equal to a sum of a thickness of the protective layer and a thickness of the mask layer.

8. The method of claim 1, wherein the punching the protective layer, the cathode coating layer, and the cathode current collector is performed at a predetermined interval apart from the central portion of the protective layer, and
    wherein an upper surface and a lower surface of the punched protective layer have a circular shape.

9. The method of claim 1, wherein pressurizing the cathode coating layer is performed after removing the mask layer.

* * * * *